Sept. 5, 1961 P. KOMROFF 2,998,711
AIR CONDITIONER

Filed July 20, 1959 3 Sheets-Sheet 1

INVENTOR.
PAUL KOMROFF
BY
Darby & Darby
ATTORNEYS

Sept. 5, 1961 P. KOMROFF 2,998,711
AIR CONDITIONER
Filed July 20, 1959 3 Sheets-Sheet 2
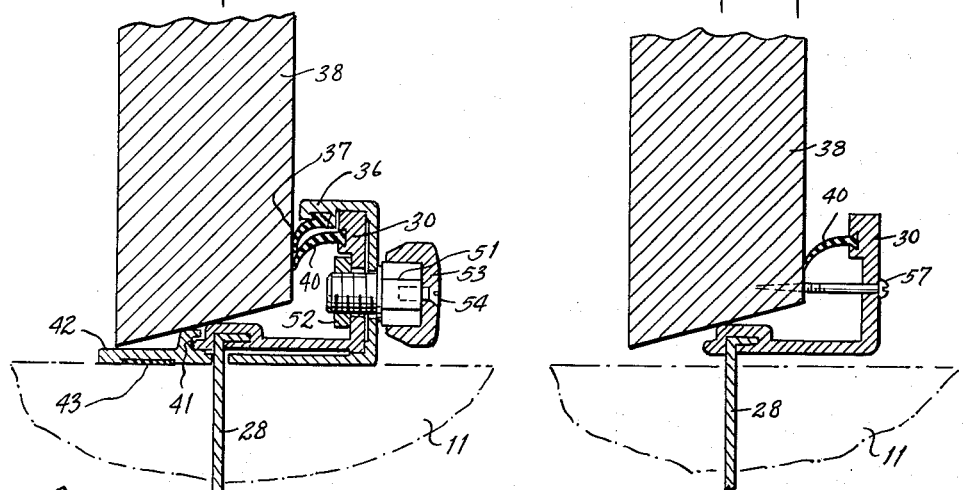
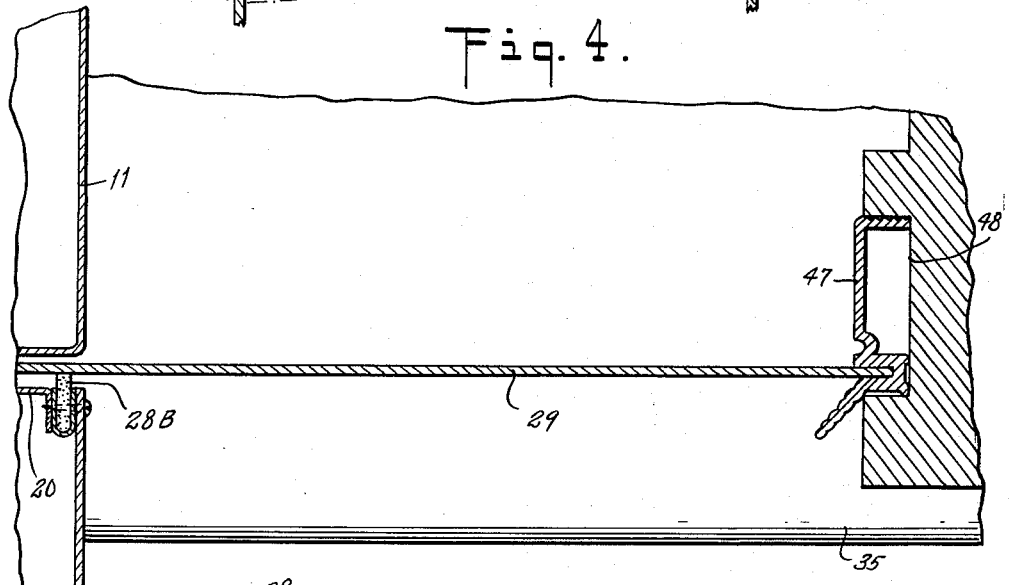
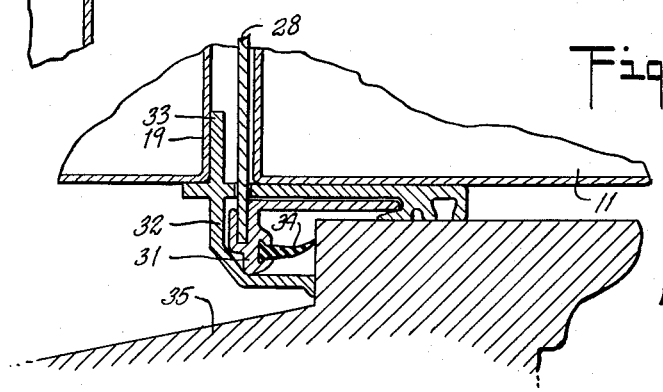
INVENTOR.
PAUL KOMROFF
BY
Darby & Darby
ATTORNEYS Sept. 5, 1961 P. KOMROFF 2,998,711
AIR CONDITIONER
Filed July 20, 1959 3 Sheets-Sheet 3
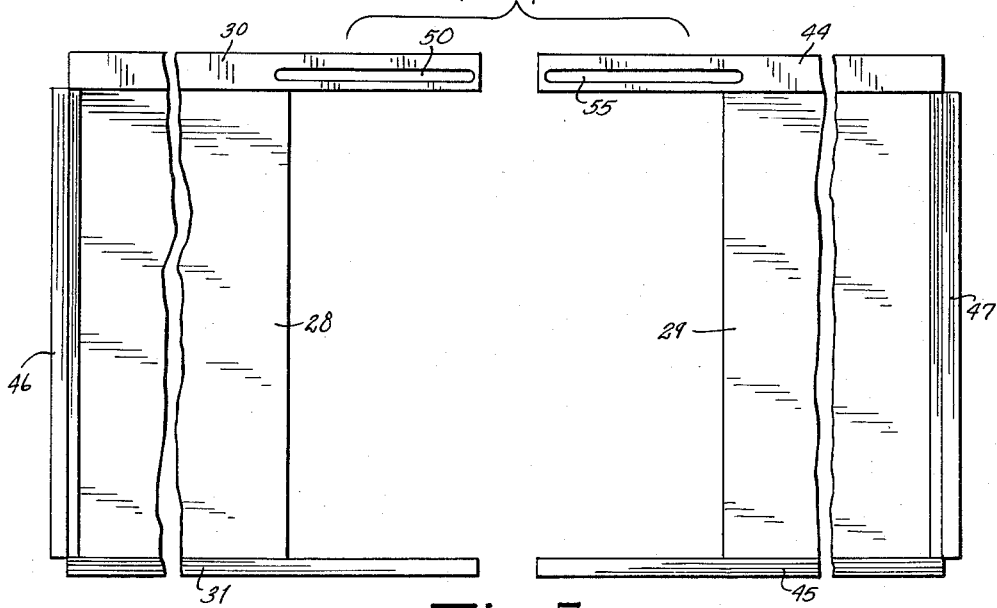
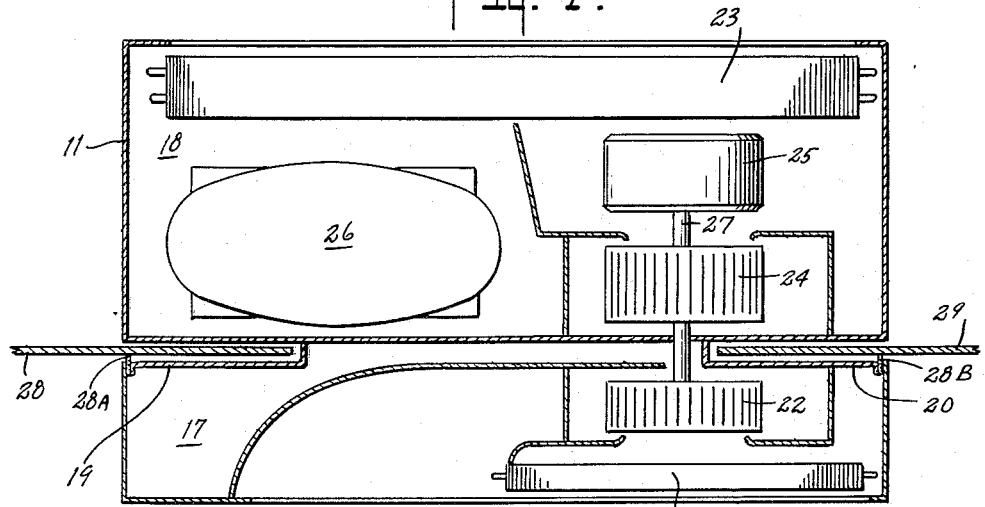
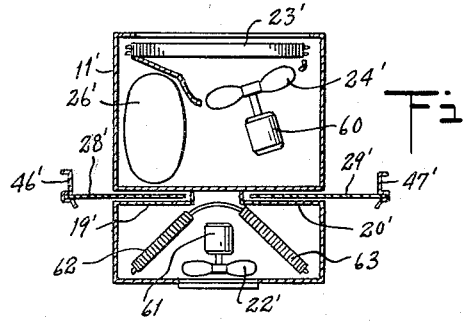
INVENTOR.
PAUL KOMROFF
BY
Darby & Darby
ATTORNEYS

2,998,711
AIR CONDITIONER

Paul Komroff, Union, N.J., assignor to Emerson Radio & Phonograph Corporation, Jersey City, N.J., a corporation of New York
Filed July 20, 1959, Ser. No. 828,133
7 Claims. (Cl. 62—262)

This invention relates to air conditioners and more particularly to an improved air conditioner of the type adapted for mounting in a window or the like.

In general, air conditioners of the window-mounted type are provided with a housing which encloses and mounts the physical components which perform the actual air conditioning function. When the air conditioner is positioned within the opening of a window or the like, suitable means must be provided to perform two functions. The first function is that of supporting and securely holding the air conditioner unit in place within the window opening, so that the air conditioner unit may not be accidentally dislodged from the window opening. The second function to be performed is that of sealing that portion of the window opening which is not occupied by the air conditioner housing itself. The latter function is important to insure that all of the air passing between the space to be air conditioned and the outside atmosphere passes only through the air conditioner unit itself.

Since air conditioners of the window-mounted type are generally mass-produced, it is important that the air conditioner be adapted for mounting in as many as possible of the wide variety of windows found in present day buildings. In order to accomplish this, it is customary to manufacture the air conditioner unit to be of a size which will be accommodated in the largest number of windows of a given type. For example, one type of air conditioner housing may be provided for double-hung windows, while another type may be provided for casement windows. When the air conditioner unit is mounted in a window, a clamping arrangement, such as a mounting plate, for example, is employed to securely fasten the air conditioner unit to the window frame itself, while separate "filler panels" are utilized to fill up the space between the air conditioner housing and the sides of the window frame. In virtually all of these installations, however, the job of installing the air conditioner is a difficult one for the average user and resort must therefore be had to the services of a qualified installation man. This, of course, adds materially to the cost of the installed unit and does not permit the unit to be readily moved from one window to another in accordance with the users' needs.

While several arrangements have been proposed for air conditioners to enable them to be easily mounted by the user in a window or the like, the problem of providing a simple installation has not been solved. In one such arrangement, the space between the air conditioner housing and the window frame is filled by panels of a fracturable material, such as Masonite, for example. The user is supplied with a large size panel which is scored at different points, so that the user may fracture the panel to make it of a size suitable for his particular installation. In another arrangement, the filler panels are "accordion pleated," so that they may be extended outwardly from the sides of the housing to engage the sides of the window. Still another arrangement employs a "window shade" type of filler panel, wherein the filler is wound upon a roll located at the side of the air conditioner housing and is unrolled by the user of the unit to a length suitable for sealing the window opening. Finally, it has been proposed to use telescoping sliding panels on the exterior of one or both sides of the air conditioner housing. The foregoing arrangements for window mounting have generally proven unsatisfactory, however, since they either require the user to "tailor" the filler panels to the window opening or they may not be suitable for use on some of the wider windows due to the range of window widths encountered. Additionally, separate mounting means must be provided in these arrangements to securely hold the air conditioner unit in the window opening, thereby adding to the installation difficulty of the user of the unit. Furthermore, it is usually difficult to render the above-described arrangements completely weathertight.

Accordingly, it is an object of this invention to provide an improved air conditioner of the type adapted for mounting in a window or the like, which air conditioner may be easily and quickly installed without the use of tools or the services of an installation man.

It is a further object of this invention to provide an improved air conditioner of the type adapted for mounting in a window or the like, which air cndoitioner employs a unitary arrangement for both mounting the air conditioner in the window opening and sealing that portion of the window opening noto ccupied by the air conditioner housing.

It is a still further object of this invention to provide an air conditioner of the type adapted for mounting in a window or the like, which air conditioner is adapted for mounting in windows of a wide range of sizes.

Briefly, the air conditioner of the invention comprises a housing for enclosing and mounting the means which perform the actual air conditioning function. The housing is provided on the sides thereof adjacent the sides of the window with vertically extending openings in which are positioned rigid filler panels. Means are provided for slidably mounting the rigid filler panels on the air conditioner housing, so that the filler panels may be telescoped within the housing itself and may be extended to engage the sides of the window during installation. Finally, means are provided for clamping the filler panels in an extended position, so that they are adapted to securely hold and support the air conditioner within the window opening. By virtue of this arrangement, the user of the air conditioner need merely extend the filler panels to engage the sides of the window and clamp them in this position to completely install the unit. This procedure is, of course, quite simple and may be easily performed by the average user of the air conditioner without the necessity of resorting to tools or the services of an installation man. Furthermore, since the filler panels are telescoped within the air conditioner housing, longer panels may be used, so that the air conditioner may be employed for a very wide range of window sizes.

In the drawings,

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1;

FIG. 5 is a sectional view taken along the line 5—5 of FIG. 1;

FIG. 6 is a front elevation view showing the details of construction of the rigid filler panels;

FIG. 7 is a horizontal sectional view taken through the air conditioner housing and showing the location of the components therein; and FIG. 8 is a horizontal sectional view taken through the housing of an air conditioner suitable for mounting in very narrow windows, such as windows of the casement type, for example.

Figure 1:
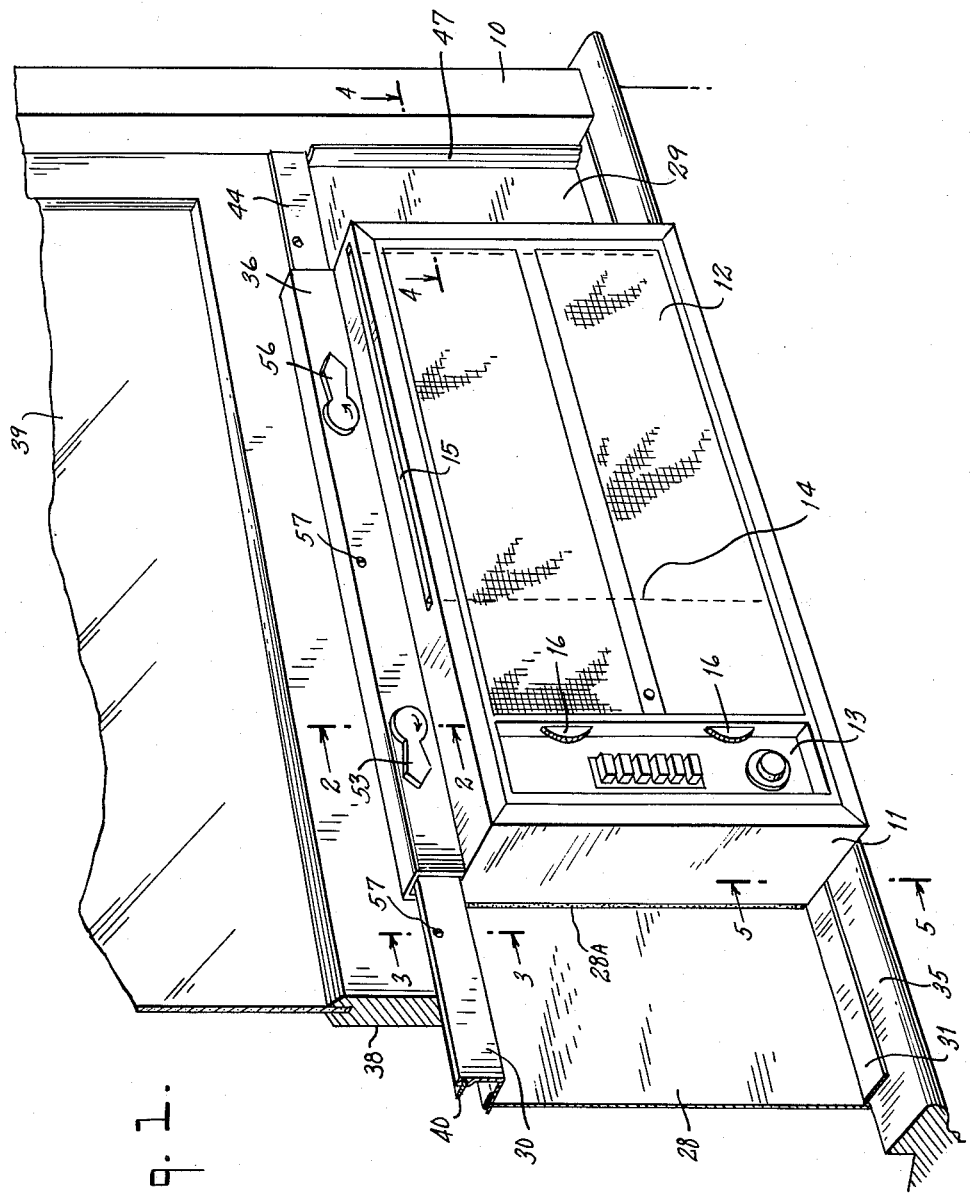
FIG. 1 is a perspective view of the air conditioner of the invention mounted in a window of the double-hung type.

Referring now to FIG 1 of the drawings, the air conditioner of the invention is shown mounted in a window 10 of the double-hung type. The air conditioner itself comprises a box-like housing 11 which may be fabricated of steel or other suitable material. The front portion of the housing comprises a grill-work 12 and a control panel 13 which may be formed of high-impact plastic material. The air in the room to be cooled is drawn in through the right side of the front portion of the housing 11 and passes through a removable filter 14 which is seated in a narrow slot 15 formed in the top of the housing. The air is then cooled and dehumidified by the refrigerating system located within the housing and is returned to the room through a pair of air directional wheels (not shown) on the left side of the front portion of the housing. The outer peripheral edges 16 of the directional wheels extend into the control panel 13 and are serrated to permit manual adjustment of air flow direction by the user of the device.

The interior of the housing 11 is shown in FIG. 7 of the drawings with the component parts of the refrigerating system illustrated schematically. As seen therein, the interior of the housing is divided into an inner compartment 17 and an outer compartment 18 by open ended slots 19 and 20 which are formed in the sides of the housing 11. As illustrated, each of the slots 19 and 20 extends over about one-quarter of the total width of the housing, so that above one-half of the width of the housing is occupied by the slots. The inner compartment 17 of the housing contains the usual evaporator or cooling coil 21 and a cooling fan 22 which forces the air in the room to pass over the cooling coil. The outer compartment 18 encloses the condenser coil 23, condenser fan 24, fan motor 25 and refrigerant compressor 26. It may be noted that fan motor 25 is arranged to drive both the cooling fan 22 and the condenser fan 24 by means of a single shaft 27.

Since the construction and operation of refrigerating systems for air conditioners are well known and form no part of the present invention, the detailed connections between the components of the system have been omitted for the sake of clarity of illustration. In general, however, the compressor 26 serves to compress the refrigerant, which is in a gaseous state, and pass it through the condenser coil 23 which converts the gaseous refrigerant to a cooled liquid. The cooled liquid refrigerant is then passed through a restrictor arrangement (not shown) to provide a pressure drop and is then passed through the evaporator coil 21 where it evaporates and asborbs heat from the air drawn over the coil. To complete the cycle, the now gaseous refrigerant is then returned to the compressor 26. Although the refrigerating system may be of any desired type and may include components of any desired type, it is preferable that the refrigerant compressor 26 be of the so-called "space-saver" or "pancake type to permit the compressor to be located in the outer compartment 18, where it does not interfere with the inwardly projecting slot 19 formed in the housing. By using a pancake type of compressor, the slots 19 and 20 may extend inwardly over a substantial portion of the width of the housing 11, so that much larger filler panels may be used to thereby accommodate the larger sizes of windows.

The open ended slots 19 and 20 serve to receive filler panels 28 and 29 which are formed of a structurally rigid material, such as embossed aluminum, for example. If desired, the panels 28 and 29 could be fabricated of a transparent or translucent material having suitable structural rigidity to permit the maximum amount of light to enter the window opening. In order to seal the openings between the filler panels and the walls of the open ended slots, "wiper" type seals 28A and 28B of "pile" material, for example, are held in place by the corners of the housing 11 at the outer ends of the slots 19 and 20, so that they bear against the inner surfaces of the filler panels. As seen in FIGS. 2, 3 and 6 of the drawings, the filler panel 28 is secured at its upper end to a substantially "L-shaped" upper slide runner 30 by any convenient means. The lower end of filler panel 28, as seen in FIG. 5 of the drawings, is similarly secured to a lower slide runner 31 which is also substantially "L-shaped." The lower slide runner 31 is slidably mounted within a lower slide channel 32 which has a portion 33 extending into the slot 19. The lower slide channel 32 is secured to the housing 11 by any convenient means, such as screws, for example, so that it firmly supports the filler panel 28 for sliding movements in and out of the slot 19. An inwardly extending seal strip 34 of rubber or the like which bears against the inner sill 35 of the window 10 is provided on the lower slide runner 31 to form a weathertight installation. The upper slide runner 30 is slidably mounted within a substantially "L-shaped" upper slide channel 36 which is secured by means, such as screws, for example, to the upper side of housing 11. A seal strip 37 of rubber or the like is secured to the upper side of slide channel 36 and bears against the bottom rail 38 of the slidable sash portion 39 of the window 10. Similarly, a seal strip 40, which again may be formed of rubber or the like is secured to the upper side of slide runner 30 and bears against the rail 38 of the window sash 39.

By virtue of this arrangement, as the filler panels 28 and 29 are extended by sliding the upper and lower slide runners in their respective slide channels, a continuous seal is maintained between the air conditioner and the bottom rail 38 of the window. At the same time, the seal strip 34 on the lower slide runner provides a continuous seal along the bottom of the air conditioner adjacent the inner sill 35 of the window. The upper slide runner 30 is also seated in a groove 41 formed in a strip 42 secured to the upper side of the housing 11, so that the filler panel 28 is securely mounted on the housing 11 of the air conditioner and may be moved in or out of the open ended slot 19. As a precaution against water leakage into the air conditioner, a seal 43 of sponge rubber, for example, may be provided in a recessed portion on the lower side of strip 42, as seen in FIG. 2 of the drawings. In a similar manner, the filler panel 29 is mounted for sliding movement in the upper and lower slide channels by means of an upper slide runner 44 and a lower slide runner 45. By this means, the filler panels 28 and 29 may be independently extended by sliding them outwardly from the housing 11. The outer ends of the filler panels 28 and 29 are secured respectively to channel members 46 and 47, which are adapted to engage the sides of the window 10 at the jamb 48 thereof. As seen in FIG. 4 of the drawings, the channel members 46 and 47 prevent any inward or outward lateral movement of the filler panels 28 and 29, so that the air conditioner unit is securely supported and mounted in the window opening.

An arrangement for clamping the filler panels 28 and 29 in their extended positions is shown in FIGS. 2 and 6 of the drawings. As seen therein, the upper slide runner 30 for the filler panel 28 is provided with a horizontally extending slot 50 to receive a lock screw 51 which passes through an opening in the upper slide channel 36. The lock screw 51 engages a nut 52 positioned behind the upper slide runner 30, so that by tightening the lock screw 51, the nut 52 frictionally engages the slide runner 30 and clamps it securely to the upper slide channel 36. By this means, the filler panel 28 may be clamped in any extended position, so that sliding movement of the panel with respect to the housing 11 is prevented. In order to facilitate tightening of the lock screw 51 by the user of the air conditioner, a handle 53 is mounted on the head of the lock screw by means of a setscrew 54. A similar clamping arrangement including a slot 55 and handle 56 is provided to clamp the filler panel 29 in an extended position. If desired, the lock screw 51 may be provided with a lefthand thread and the lock screw associated with handle 56 provided with a righthand thread, so that rotation of the handles 53 and 56 in opposite directions serves to tighten or loosen the filler panels.

As thus far described, it is believed apparent that the air conditioner of the invention may be rigidly mounted in a window opening merely by extending the filler panels 28 and 29 until they engage the sides of the window and then tightening the handles 53 and 56 to clamp the panels in the extended position. When this is done, the air conditioner unit is restrained from inward or outward lateral movements by the combined action of the channel members 46 and 47, which engage the jamb of the window, and the upper slide runners 30 and 44 and upper slide channel 36 which bear against the bottom rail 38 of the sash portion of the window. At the same time, the filler panels 28 and 29 serve to seal that portion of the window opening not occupied by the air conditioner housing 11, so that both the functions of mounting and sealing the air conditioner are accomplished by the use of the filler panels 28 and 29. While the arrangement thus far described securely supports the air conditioner in the window, the upper slide runners 30 and 44 may be secured to the bottom rail 38 of the window sash by means of one or more screws 57, as seen in FIG. 3 of the drawings, to thereby provide an added measure of safety in the event that the handles 53 and 56 are accidentally opened. Furthermore, the screws 57 provide a means for locking the window to prevent unauthorized window opening. It is believed apparent from the foregoing description that the air conditioner of the invention may be easily installed in a window or other opening without the necessity of employing tools or complicated supplementary mounting devices. The installation procedure is so simple that the average user of such an air conditioner may easily install it himself and, if desired, may move the air conditioner from one window to another in accordance with his needs.

While the air conditioner illustrated in FIGS. 1–7 of the drawings is especially suitable for use with windows of the double-hung type, it will be understood that it could also be employed for other, different, types of windows. Where the window width is very narrow, as in some casement windows, for example, it may be desirable to employ a much narrower housing than that shown in FIGS. 1–7. FIG. 8 of the drawings illustrates how the interior of the air conditioner may be modified to decrease the width of the housing. In describing this form of the invention, the same reference characters, but with a prime notation, will be utilized to designate the same or similar parts as found in the embodiment of FIGS. 1–7. As seen in FIG. 8, the open-ended slots 19' and 20' occupy a greater portion of the width of the housing 11' than in the embodiment of FIGS. 1–7. Because of this, it is not practical to employ a single motor to drive both the cooling fan 22' and the condenser fan 24', since a single drive shaft connecting both fans with the fan motor would interfere with the filler panels 28' and 29'. Therefore, in the arrangement of FIG. 8, separate fan motors 60 and 61 are provided for the condenser fan 24' and the cooling fan 22'. Additionally, in order to further conserve space, the evaporator coil may be formed in two sections 62 and 63 and placed at an angle with respect to the cooling fan 22' as illustrated. In all other respects, however, the construction of the air conditioner may be substantially the same as the embodiment shown in FIGS. 1–7 of the drawings.

It is believed apparent that many changes could be made in the above-described air conditioner and many seemingly different embodiments of the invention constructed without departing from the scope thereof. For example, the locking screws and nuts provided for clamping the filler panels in an extended position could be replayed by a ratchet and pawl arrangement. Similarly, the housing of the air conditioner could assume other shapes. Accordingly, it is intended that all matter contained in the above description or shown in the accompanying drawings shall be interpreted as illustrative and not in a limiting sense.

What is claimed is:

1. In an air conditioner including means for conditioning air, the combination comprising a housing enclosing said air conditioning means, said housing being adapted to be located in a window or the like and having at least one vertically extending recessed portion formed therein adjacent a side of said window, said recessed portion extending laterally within said housing to a substantial depth, so that the recessed portion is adapted to telescopically receive a filler panel for sealing the window opening; a vertically extending filler panel telescopically disposed within said recessed portion; and means mounted on said housing for slidably mounting said filler panel within said recessed portion to permit movement of the panel in and out of the portion, so that said panel is adapted to be extended to engage said side of the window, to thereby with said housing seal the window opening.

2. In an air conditioner including means for conditioning air, the combination comprising a housing enclosing said air conditioning means, said housing being adapted to be located in a window or the like and having a pair of vertically extending recessed portions formed therein on opposite sides thereof adjacent the sides of said window, each of said recessed portions extending laterally within said housing to a substantial depth, so that the recessed portion is adapted to telescopically receive a filler panel for sealing the window opening; a pair of vertically extending filler panels telescopically disposed within said recessed portions; means mounted on said housing for slidably mounting said filler panels within said recessed portions to permit movement of the panels in and out of the portions, so that said panels are adapted to be laterally extended to engage the sides of the window to thereby with said housing seal the window opening; and means for securing said filler panels in extended position to mount said housing in the window opening.

3. The combination claimed in claim 2, wherein said last-named means clamps said filler panels with respect to said housing, so that lateral sliding movement between said panels and said housing is prevented.

4. In an air conditioner including means for conditioning air, the combination comprising a housing enclosing said air conditioning means, said housing being adapted to be located in a window or the like and having a pair of vertically extending recessed portions formed therein on opposite sides thereof adjacent the sides of said window, each of said recessed portions extending laterally within said housing to a substantial depth, so that the recessed portion is adapted to telescopically receive a filler panel for sealing the window opening; a pair of vertically extending filler panels telescopically disposed within said recessed portions; means including a pair of laterally extending slide channels mounted on and extending over the upper and lower surfaces of said housing adjacent said recessed portions for slidably mounting said filler panels within said portions to permit movement of the panels in and out of the portions, so that said panels are adapted to be laterally extended to engage the sides of the window to thereby with said housing seal the window opening; and means for clamping said filler panels to at least one of said slide channels to prevent lateral movement between said panels and said housing, so that said panels are adapted to be clamped in extended position to mount said housing in the window opening.

5. In an air conditioner including means for conditioning air, the combination comprising a box-like housing enclosing said air conditioning means, said housing being adapted to be located in a window or the like and having a pair of vertically extending open ended slots formed therein on opposite sides thereof adjacent the sides of said window, each of said slots extending laterally within said housing to a substantial depth, so that each slot is adapted to telescopically receive a filler panel for sealing the window opening; a pair of vertically extending filler panels telescopically disposed within said slots; a pair of laterally extending lower slide runners mounted on the lower portions of said filler panels; a pair of laterally extending upper slide runners mounted on the upper portions of said filler panels, each of said upper slide runners having an elongated laterally extending opening formed therein; a laterally extending upper slide channel mounted on and extending over the top of said housing adjacent said slots for slidably receiving said upper slide runners; a laterally extending lower slide channel mounted on and extending over the bottom of said housing adjacent said slots for slidably receiving said lower slide runners; and means for clamping said upper slide runners to said upper slide channel including a pair of locking screws passing through said upper slide channel and said openings in said upper slide runners and a pair of locking nuts in engagement with said screws, whereby said filler panels are adapted to be extended to engage the sides of said window and are adapted to be clamped in extended position by said last-named means, so that said filler panels cooperate with said housing to seal the window opening and to mount said housing in the window opening.

6. In an air conditioner having means for conditioning air including a pancake compressor, a condenser coil, an evaporator coil, a cooling fan, a condenser fan and motor means for driving said fans, the combination comprising a box-like housing adapted to be located in a window or the like, said housing being divided into inner and outer compartments by a pair of vertically extending open ended slots formed therein on opposite sides thereof adjacent the sides of said window, each of said slots extending laterally within said housing to a substantial depth, so that each slot is adapted to telescopically receive a filler panel for sealing the window opening, said inner compartment having said evaporator coil and cooling fan mounted therein, said outer compartment having said compressor, condenser coil and condenser fan mounted therein; a pair of vertically extending filler panels telescopically disposed within said slots; a pair of laterally extending lower slide runners mounted on the lower portions of said filler panels; a pair of laterally extending upper slide runners mounted on the upper portions of said filler panels, each of said upper slide runners having an elongated laterally extending opening formed therein; a laterally extending upper slide channel mounted on and extending over the top of said housing adjacent said slots for slidably receiving said upper slide runners; a laterally extending lower slide chanel mounted on and extending over the bottom of said housing adjacent said slots for slidably receiving said lower slide runners; and means for clamping said upper slide runners to said upper slide channel including a pair of locking screws passing through said upper slide channel and said openings in said upper slide runners and a pair of locking nuts in engagement with said screws, whereby said filler panels are adapted to be extended to engage the sides of said window and are adapted to be clamped in extended position by said last-named means, so that said filler panels cooperate with said housing to seal the window opening and to mount said housing in the window opening.

7. In an air conditioner including means for conditioning air, the combination comprising a housing enclosing said air conditioning means, said housing being adapted to be located in a window or the like and having at least one vertically extending recessed portion formed therein adjacent a side of said window, said recessed portion extending laterally within said housing to a substantial depth, so that the recessed portion is adapted to telescopically receive a rigid filler panel for sealing the window opening; a vertically extending rigid filler panel telescopically disposed within said recessed portion; means mounted on said housing for slidably mounting said filler panel within said recessed portion to permit movement of the panel in and out of the portion, so that said panel is adapted to be extended to engage said side of the window, to thereby with said housing seal the window opening; and means for securing said filler panel in extended position to mount said housing in the window opening.

References Cited in the file of this patent
UNITED STATES PATENTS

| | | |
|---|---|---|
| 2,433,104 | Eberhart | Dec. 23, 1947 |
| 2,781,717 | Hord | Feb. 19, 1957 |
| 2,799,062 | Callan | July 16, 1957 |
| 2,814,244 | Hord | Nov. 26, 1957 |
| 2,925,026 | Schuster | Feb. 16, 1960 |